United States Patent Office 3,516,962
Patented June 23, 1970

3,516,962
STABILIZATION OF POLYACETALS WITH METAL SALTS OF 2-MERCAPTOBENZIMIDAZOLE
Rune J. V. Hojfors and Monica Sjostrand, Perstorp, Sweden, assignors to Perstorp AB, Perstorp, Sweden
No Drawing. Filed Jan. 26, 1968, Ser. No. 700,700
Claims priority, application Sweden, Feb. 16, 1967, 2,144/67
Int. Cl. C08g 51/62
U.S. Cl. 260—45.75       5 Claims

ABSTRACT OF THE DISCLOSURE

Polyacetals are made stable against the effects of heat and oxygen by incorporating a zinc, lead copper or tellurium salt of 2-mercaptobenzimidazole.

The present invention relates to a method for the stabilization of polyacetals against thermal and oxidative degradation.

It is known that polyacetals depolymerize at high temperatures dissipating formaldehyde from the ends of the chains. A so-called zippering effect is obtained.

Different methods are used for stabilizing polyacetals. The hydroxyl groups at the ends are esterified or etherified, or a polyacetal having regularly recurring C—C-bonds in the polymer chain is produced, whereafter the unstable end groups are split off until one comes to a C—C-bond which is stronger than the ether bonds in the chain.

To obtain a further stabilizing of the polyacetals, it is known to use certain amides, sulphone amides, hydrazines etc., which may be mixed with the polymer in different ways and in different amounts.

According to the present invention a polyacetal has been obtained which is very stable against heat and oxidation by adding to the polymer a stabilizer containing a salt of the compound 2-mercaptobenzimidazole.

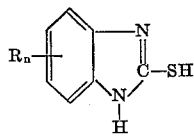

where $n=1$–$4$ and R=hydrogen or a hydroxyl group.

A suitable embodiment of the invention is a zinc salt of the abovementioned compound, when $n=4$ and R=H. However, other metal salts as for example Pb, Cu or Te of the same compound or of a substituted variation thereof may be used.

Besides the above-mentioned compound the stabilizer may contain further at least one stabilizing compound as for example thiobisphenol, 1,3,5-trimethyl-2,4,6-tris(3,5-diteritary butyl-4-hydroxybenzyl)-benzene or 2,2′-methylenebis-(4-methyl-6-tertiary butyl phenol) whereby an advantageous combination effect is obtained.

The stabilizer according to the invention is suitably added in an amount of 0.005–10 percent by weight of the end product, but other amounts may be used.

The polyacetals to be stabilized according to the invention are preferably homo- or copolymers of polyoxymethylene.

The invention will be described more in detail in the following embodiment examples and the table. The zinc salt of 2-mercaptobenzimidazole (ZMB) is a compound according to the invention, while other compounds are known stabilizers which have been included for comparison. In the table the loss of weight is shown in percent on samples containing different stabilizers when heated

TABLE

| Stabilizer | Stabilizer percent by weight of the polymer | Polymer | Number of stabilizers | Loss of weight in percent by heating for 30 min. at 190° C. in air | Loss of weight in percent per minute at 222° C. in inert atmosphere |
|---|---|---|---|---|---|
| | 0 | Copolymer of trioxane and 5 percent by weight dioxolane. | 0 | 64.4 | 0.6 |
| 2,2′-methylenebis-(4-methyl-6-tertiary butyl phenol). | 1 | do | 1 | 40.2 | 0.06 |
| Cyanoguanidine | 1 | do | 1 | 23.4 | 0.02 |
| ZMB | 1 | do | 1 | 0.8 | 0.04 |
| 2,2′-methylenebis-(4-methyl-6-tertiary butyl phenol). +Cyanoguanidine | 0.3 0.1 | do | 2 | 19.6 | |
| 2,2′-methylenebis-(4-methyl-6-tertiary butyl phenol). +ZMB | 0.5 0.2 | do | 2 | 1.0 | |
| Thiobisphenol +ZMB | 0.3 0.1 | do | 2 | 0.6 | |
| 1,3,5-trimethyl-2,4,6-tris(3,5-ditertiary butyl-4-hydroxybenzyl)-benzene. +ZMB | 0.5 0.2 | do | 2 | 1.2 | | for 30 minutes at 190° C. in air and the loss of weight in percent per minute at 222° C. in inert atmosphere.

Example 1

The finely pulverized copolymer of trioxane and 5 percent by weight of dioxolane was stabilized with 1 percent by weight ZMB by suspending the polymer in a solution of the stabilizer, whereupon the solvent was distilled off. The unstable end groups were spilt off and the polymer was then dried during 2 hours in vacuum at 50° C. The stabilized polymer was thereafter heated for 30 minutes at 190° C. in a stream of air.

Example 2

The same polymer as in Example 1 was stabilized in the same way as described in that example. The sample was heated at 222° C. in inert atmosphere during 30 minutes, whereupon the rate of decomposition was measured.

Example 3

The same polymer as in Example 1 was stabilized with a blend of the same stabilizer as in Example 1 and thiobisphenol which blend was admixed to the polymer in the same way as in Example 1. The sample was heated for 30 minutes at 190° C. in a stream of air.

Example 4

Example 3 was repeated with the modification that 2,2′-methylene-bis-(4-methyl-6-tertiary butyl phenol) was added instead of thiobisphenol.

Example 5

Example 3 was repeated again with the difference that 1,3,5-trimethyl-2,4,6-tri(3,5 - ditertiary butyl-4-hydroxybenzyl)-benzene was added instead of thiobisphenol.

The known stabilizers which were included for comparison were added to the copolymer in the same way as described in Example 1.

The polyacetal stabilized according to the invention is appreciably more stable both against thermal and oxidative degradation than a corresponding polyacetal stabilized with the known compared stabilizers.

By the invention an unusually stable and for the most production purposes suitable product is accordingly obtained.

The invention is not limited to the embodiment examples shown but can be modified in different ways within the scope of the invention.

We claim:

1. A polymer composition comprising a polyacetal and a stabilizing amount of a zinc, lead, copper or tellurium salt of a 2-mercaptobenzimidazole having the formula:

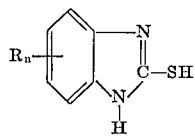

wherein $n=1$ to 4 and R=hydrogen or a hydroxyl group.

2. A polymer composition according to claim 1, wherein $n=4$ and R=hydrogen.

3. A polymer composition according to claim 1 comprising in addition at least one other stabilizing compound selected from the group consisting of thiobisphenol; 1,3,5 - trimethyl - 2,4,6 - tris(3,5 - ditertiary butyl-4 - hydroxy-benzyl)benzene; and 2,2' - methylenebis(4-methyl - 6 - tertiary butyl phenol).

4. A polymer composition according to claim 2 comprising in addition at least one other stabilizing compound selected from the group consisting of thiobisphenol; 1,3,5 - trimethyl - 2,4,6 - tris(3,5 - ditertiary butyl 4-hydroxybenzyl) benzene; and 2,2' - methylenebis(4-methyl-6-tertiary butyl phenol).

5. A polymer composition according to claim 1 comprising 0.005–10% by weight of the stabilizer calculated on the end product.

References Cited

UNITED STATES PATENTS 3,359,232 12/1967 Rosen _____ 260—45.8
3,424,819 1/1969 Green _____ 260—45.8

DONALD E. CZAJA, Primary Examiner

V. P. HOKE, Assistant Examiner

U.S. Cl. X.R.

260—45.95, 45.9